June 27, 1933.  M. GOLDSCHMIDT  1,915,732
DISK CLUTCH
Filed July 25, 1929
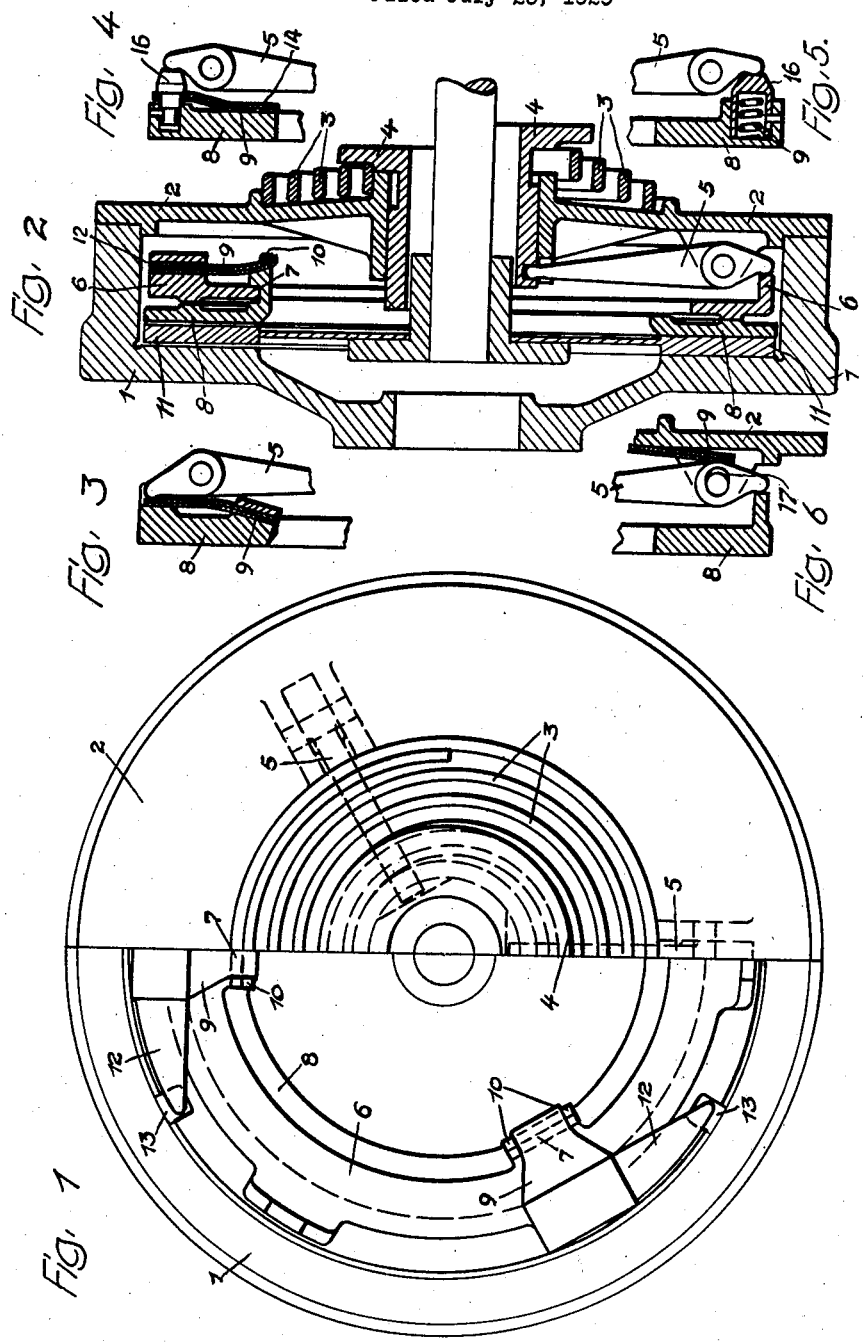
M. Goldschmidt
INVENTOR
By: Marks & Clerk
Attys.

Patented June 27, 1933

1,915,732

UNITED STATES PATENT OFFICE

MAX GOLDSCHMIDT, OF FRANKFORT-ON-THE-MAIN, GERMANY, ASSIGNOR, BY DIRECT AND MESNE ASSIGNMENTS, OF ONE-THIRD TO MECANO, GESELLSCHAFT MIT BESCHRÄNKTER HAFTUNG, OF FRANKFORT-ON-THE-MAIN, GERMANY, AND ONE-THIRD TO FICHTEL & SACHS A. G., OF SCHWEINFURT-ON-THE-MAIN, GERMANY

DISK CLUTCH

Application filed July 25, 1929, Serial No. 381,021, and in Germany October 6, 1928.

This invention relates to a disk clutch for motor vehicles.

The main object of this invention is to enable the vehicle to be started gradually and without shocks, without it being necessary, as hitherto, to exercise special care in closing the clutch by means of the foot lever.

A further object of the invention is to facilitate the fitting of the clutch into vehicles of different constructions, in order that in the case of a motor with a disk fly-wheel and clutch of different makes, the two may be manufactured independently of one another as far as possible.

The shock-free engagement of the two clutch elements is obtained according to the present invention by providing weak springs which counteract and exert a damping action on the main clutch spring, when the clutch is being closed. The insertion of the clutch is facilitated by the fact that all the parts of the clutch form a coherent whole, and can be fitted as such to the fly-wheel disk belonging to the motor, so that the manufacture thereof remains unaffected even to the screw-threaded holes for fastening purposes.

Various constructional forms of the invention are illustrated in the accompanying drawing, in which:—

Figure 1 shows a front elevation view of the clutch, half the cover being removed.

Figure 2 is a longitudinal section in the vertical plane of symmetry of the clutch, and Figures 3, 4, 5 and 6 show various constructional forms of the antagonistic spring in section.

The disk fly-wheel 1 of the motor constitutes at the same time in a known manner the clutch casing, and has as such a machined surface as a bearing surface for the clutch ring, and also a number of screw-threaded holes at the edge for the purpose of fastening the casing cover 2.

In making the fly-wheel disk, therefore, according to the present invention only these two points have to be taken into consideration, which occasions no difficulty.

The mounting of the clutch comprises in a known manner a main clutch spring 3, which bears at one end against a sliding sleeve 4, which is displaceable with respect to the shaft by means of a foot lever, and at the other end against a casing cover 2 secured by screws to the disk fly-wheel 1. In recesses in the sliding sleeve there engage the ends of the longer arms of a number of two-armed radially directed levers 5, which are fulcrumed on the inside of the casing cover 2, and press with their short arms, when the clutch is closed, upon noses on an intermediate ring 6, which engages, by means of tongues 7 directed radially inwards, in grooves on the margin of a main or foundation ring 8. These grooves are broader than the engaging tongues 7, and therefore, when the clutch is opened, the intermediate ring 6 is kept away from the foundation ring 8 by springs 9 which are secured to the intermediate ring and which press upon the edges of the foundation ring 8. Stops 10 on the edges on both sides of the springs 9 prevent the intermediate ring 6 from rotating relatively to the pressure ring 8. The springs 9, according to the present invention, act as antagonistic springs in relation to the main clutch spring 3, so that upon the clutch being closed suddenly, by quick release of the foot lever, no grabbing of the foundation ring 8 upon the clutch ring 11 takes place, but with progressive stressing of the springs 9 there is a gradual strengthening of the pressure on the clutch ring 11 which in a known manner is rigidly connected with the shaft, with which the fly wheel is to be coupled. In order to remove the foundation ring 8 from the clutch ring 11 even when the clutch is opened, transversely directed blade springs 12 are clamped over the springs 9, and press with their free ends upon tappet pins 13 projecting in the casing 1 and guiding the foundation ring 8.

The intermediate ring 6 may be omitted, as shown in Figure 3, in order to simplify the construction and cheapen the manufacture, if the springs 9 are secured to the foundation ring 8, and the pressure levers 5 press with their short arms directly upon the ends of the springs 9. If it is undesirable to fit the pressure levers 5 to the springs 9, it is even possible to select instead of this, one of the constructions illustrated in Figures 4 and 5, according to which the spring acts as a blade spring 14 or a coil spring 15 upon a solid or hollow bolt 16, which is guided in a bore in the foundation ring 8 and upon which the lever 5 presses.

Furthermore the antagonistic springs 9, without altering their general effectiveness, may be arranged at the bearing positions of the levers 5, so that they constitute the fulcra of the latter and make the said fulcra resiliently yielding. The levers 5 act in this case not only as two-armed levers, but also as one-armed levers, the fulcrum being located at the point at which the short arm is supported. Figure 6 illustrates one constructional form of this method of arrangement of the spring 9, the pivotal hole in the lever 5 being constructed as an elongated hole 17 and the spring 9 pressing behind the latter on the lever 5.

Instead of the intermediate ring 6 and the foundation ring 8, each being made in one piece, they may both be made in separate segments on each of which a pressure lever 5 acts in the manner described. In this way it is achieved that the separate segments fit against the clutch ring 11 independently of one another.

What I claim is:

1. A disk clutch for coupling shafts in an automobile vehicle, comprising a clutch ring mounted fast upon one of the shafts, a casing cover, a foundation ring adapted to be pressed against the said clutch ring, a main clutch spring bearing against the casing cover, antagonistic springs weaker than the main clutch spring bearing against the foundation ring and opposing some resistance to the closing of the clutch and pressure levers mounted within the casing cover, adapted to subject the antagonistic springs to a progressively increasing stress while the clutch is being closed and pressing on the foundation ring through the intermediary of the antagonistic springs with a progressively increasing force while the clutch is being closed, the antagonistic springs being disposed between the pressure levers and the foundation ring.

2. A disk clutch for coupling shafts in an automobile vehicle, comprising a clutch ring mounted fast upon one of the shafts, a casing cover, a foundation ring adapted to be pressed against the said clutch ring, a main clutch spring bearing against the casing cover, antagonistic springs weaker than the main clutch spring bearing against the foundation ring and opposing some resistance to the closing of the clutch and pressure levers mounted within the casing cover, adapted to subject the antagonistic springs indirectly to a progressively increasing stress while the clutch is being closed and pressing on the foundation ring through the intermediary of the antagonistic springs with a progressively increasing force while the clutch is being closed, the antagonistic springs being disposed between the pressure levers and the foundation ring.

3. A disk clutch for coupling shafts in an automobile vehicle, comprising a clutch ring mounted fast upon one of the shafts, a foundation ring adapted to be pressed against the said clutch ring, a main clutch spring, antagonistic springs weaker than the main clutch spring, the said antagonistic springs being fitted to the foundation ring and being adapted to oppose to the closing of the clutch, a resistance which increases progressively while the clutch is being closed, and being also adapted to keep the foundation ring out of frictional contact with the clutch ring when the clutch is open, and pressure levers actuated through the main clutch spring and pressing upon the foundation ring with a force which increases progressively while the clutch is being closed, the antagonistic springs being disposed between the pressure levers and the foundation ring.

4. A disk clutch for coupling shafts in an automobile vehicle, comprising a clutch ring mounted fast upon one of the shafts, a foundation ring adapted to be pressed against the said clutch ring, an intermediate ring supported in front of the foundation ring, a main clutch spring, antagonistic springs weaker than the main clutch spring, the said antagonistic springs being fitted to the intermediate ring and being adapted to oppose to the closing of the clutch a resistance which increases progressively while the clutch is being closed and being also adapted to keep the foundation ring out of frictional contact with the clutch ring and with the intermediate ring when the clutch is open, and pressure levers actuated through the main clutch spring and pressing upon the foundation ring through the intermediate ring with a force which increases progressively while the clutch is being closed.

5. A disk clutch for coupling shafts in an automobile vehicle, comprising a clutch ring mounted fast upon one of the shafts, a foundation ring adapted to be pressed against the said clutch ring, a main clutch spring, pressure levers actuated through the main clutch spring and antagonistic springs weaker than the main clutch spring, the said antagonistic springs being fitted to the pressure levers and being adapted to oppose to the closing of the clutch a resistance which increases progressively while the clutch is being closed, and the pressure levers being adapted to press upon the foundation ring with a force which increases progressively while the clutch is being closed.

6. A disk clutch for coupling shafts in an automobile vehicle, comprising a clutch ring mounted fast upon one of the shafts, a clutch casing mounted upon the other shaft, a foundation ring adapted to be pressed against the said clutch ring, tappet pins projecting inwards from the periphery of the clutch casing and guiding the foundation ring, an intermediate ring supported in front of the foundation ring, a main clutch spring, antagonistic springs weaker than the main clutch spring, the said antagonistic springs opposing some resistance to the closing of the clutch, pressure levers actuated through the main clutch spring and pressing upon the foundation ring through the intermediate ring with a force which increases progressively while the clutch is being closed, and being adapted to subject the said antagonistic springs to a progressively increasing stress while the clutch is being closed, and the intermediate ring bearing resiliently against the tappet pins.

In testimony whereof I have signed my name to this specification.

MAX GOLDSCHMIDT.